A. T. WEAVER.
BALE TIE.
APPLICATION FILED JULY 11, 1913.
1,109,720.
Patented Sept. 8, 1914.
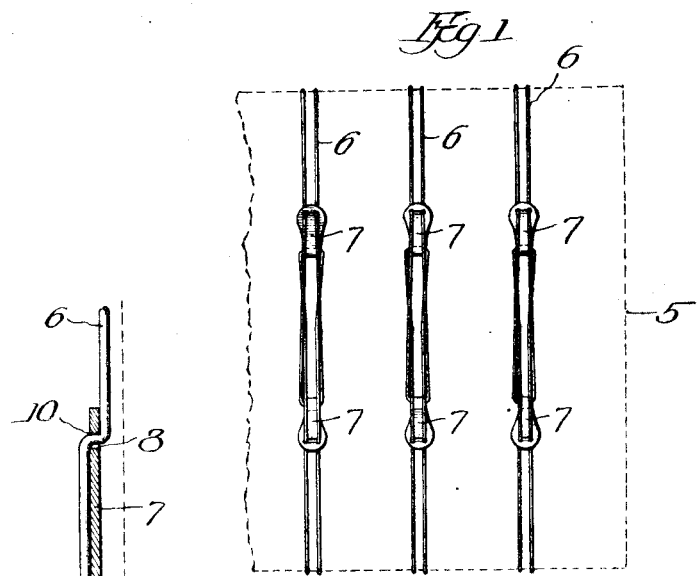
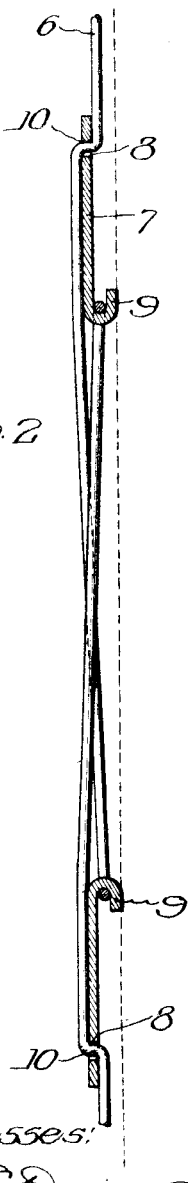
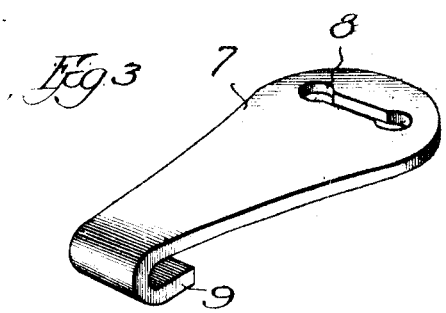
Witnesses:
Inventor
Albert T. Weaver
By Linthicum Belt & Fuller
Attys

UNITED STATES PATENT OFFICE.

ALBERT T. WEAVER, OF JOLIET, ILLINOIS, ASSIGNOR TO THE AMERICAN STEEL & WIRE COMPANY OF NEW JERSEY, OF HOBOKEN, NEW JERSEY, A CORPORATION OF NEW JERSEY.

BALE-TIE.

1,109,720.   Specification of Letters Patent.   Patented Sept. 8, 1914.

Application filed July 11, 1913. Serial No. 778,518.

*To all whom it may concern:*

Be it known that I, ALBERT T. WEAVER, a citizen of the United States, residing at Joliet, in the county of Will and State of Illinois, have invented certain new and useful Improvements in Bale-Ties, of which the following is a specification.

This invention relates to ties and more particularly to bale ties adapted for binding cotton or other similar bales and the primary object of the present invention is to provide a tie which can be easily altered in length so that it may be used first on a gin bale and subsequently on a smaller compress bale, thereby making it unnecessary to apply new bands or ties to a bale after it has been compressed.

I have described in the following specification and illustrated in the accompanying drawings, which should be considered in connection therewith, one preferred embodiment of the invention, but it should be understood that the invention is not limited to the particular embodiment disclosed, the true scope of the invention being defined in the appended claims.

Referring to the drawings: Figure 1 is a fragmentary view of a bale provided with a number of my improved ties; Fig. 2 is an enlarged longitudinal sectional view, showing the connection of the buckles with the band or loop; and Fig. 3 is a perspective view of one of my novel buckles.

On the drawings, reference character 5 designates a bale (shown in dotted lines) with my improved ties applied thereto. Each tie comprises a band 6 consisting of a loop of endless wire preferably formed from a length of wire by welding the ends together. The band or loop should be of sufficient length to completely encircle a bale and permit the ends to overlap.

Each loop is provided with a pair of metal buckles 7, each being provided at one end with an opening 8 through which an end of the loop may be threaded, either before or after the ends of the wire length are welded together, and having its other end bent backwardly to provide a hook 9, as shown. The ends of the loop are passed upwardly through the openings 8 and extend beyond the ends of the hooks 9. In applying my improved tie to a bale it is first placed around the bale and each hook 9 is engaged with the opposite end of the loop. The buckles are then moved away from each other along the loop to tighten the tie and when the tie has been put under sufficient tension the buckles will be prevented from slipping on the loop by the engagement of the edges of the openings 8 with the wires. The wires are, therefore, firmly gripped or clamped by the edges of the openings 8 and in most instances the wires will be bent both above and beneath the buckle as indicated by reference character 10 in Fig. 2, so that slippage of the buckles on the loop is precluded.

It will be manifest that my improved tie is adjustable to bundles or bales of various sizes and if it is employed in connection with cotton bales the ties should be made of sufficient length to encircle the gin bale in the first instance, and when this bale is reduced in size by a compress machine, the buckles may be slid apart to reduce the tie to the proper length. My improved tie may be readily and quickly applied to a bale or bundle, and when applied, securely binds the bale under the required tension. It should be noted, furthermore, that no projecting ends, or rough or sharp corners or edges are presented by my improved tie, the feature of smoothness being of considerable importance particularly in the handling of cotton bales.

I claim:

1. A bale tie comprising a loop of endless wire, and a pair of buckles slidably connected with the loop, each of said buckles being constructed to engage with the wires of the loop and prevent slippage of the buckle along the loop under pull on the buckle longitudinally thereof.

2. A bale tie comprising a loop of endless wire, and a pair of buckles slidably mounted on said loop near each end thereof, each buckle having provisions for connection with the end of the loop projecting from the other buckle.

3. A bale tie comprising a band of endless wire, and a pair of oppositely disposed buckles slidably mounted on said band, each buckle being provided with a hook for connection with an end of the band and having a slot through which the other end of the band passes, the walls of said slots being adapted to engage with the band under tension exerted on said buckles longitudinally thereof and prevent slippage of the buckles on the band.

4. A bale tie comprising a loop of endless wire adapted to be disposed around a bale with the ends of the loop overlapping, and buckles, each connected with one of said overlapping ends and slidably engaged with the loop adjacent the other end thereof, said buckles being adapted to grip the loop and prevent slippage between the loop and the buckles under pull exerted longitudinally of the buckles.

5. A bale tie comprising a loop of endless wire, and a pair of buckles each provided with an opening through which the ends of said loop are threaded, said buckles having hooks to engage with the opposite ends of the loops to draw the ends past each other and tighten the tie as the buckles are moved apart along the loop.

ALBERT T. WEAVER.

Witnesses:
JAMES E. SIME,
A. F. ALLEN.